May 1, 1951     W. S. GULLETTE     2,550,922
HYDROCARBON CONVERSION APPARATUS
Filed June 3, 1947
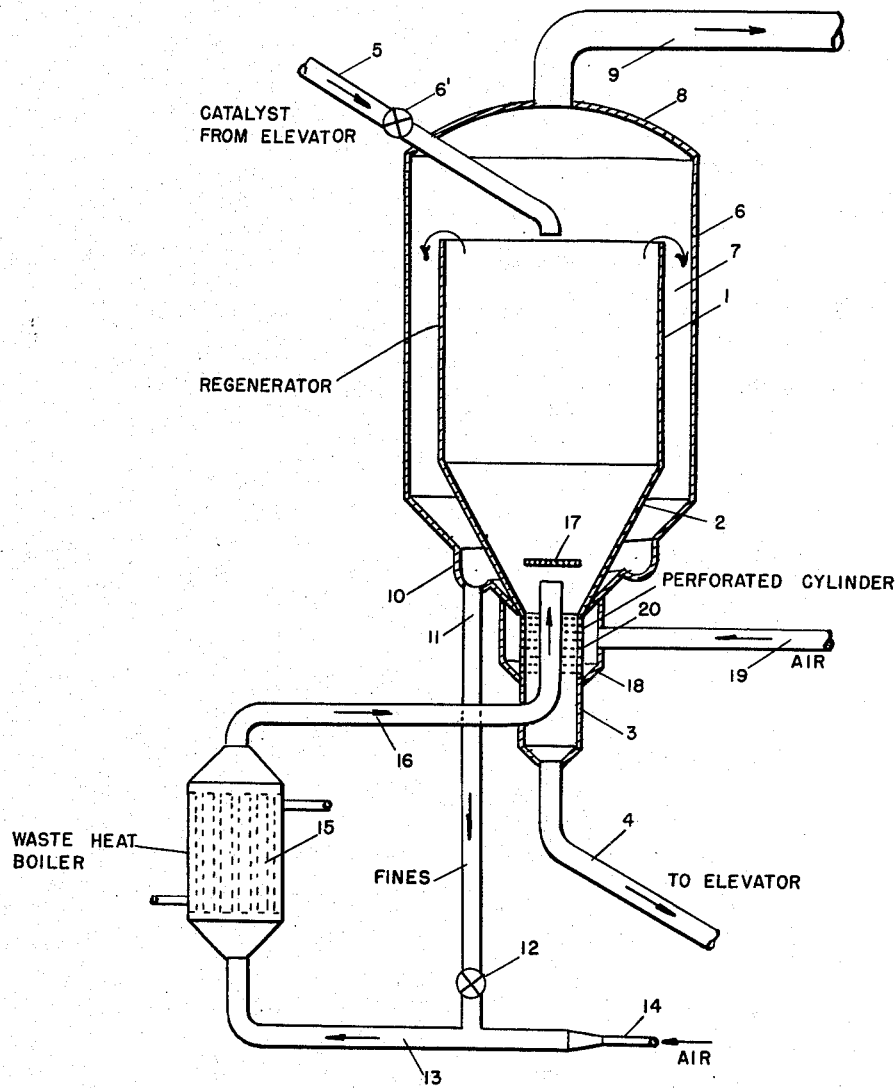
INVENTOR.
WILLIS S. GULLETTE
BY
Pennie, Edmonds, Morton & Barrows
ATTORNEYS Patented May 1, 1951

2,550,922

UNITED STATES PATENT OFFICE 2,550,922

HYDROCARBON CONVERSION APPARATUS

Willis S. Gullette, Highland, Ind., assignor to Sinclair Refining Company, New York, N. Y., a corporation of Maine Application June 3, 1947, Serial No. 752,238

2 Claims. (Cl. 23—288)

This invention relates to the conversion of hydrocarbons.

In the conversion of hydrocarbon base stocks to produce products having desired properties, such as high octane number for use in gasoline, the stock is conventionally submitted to one of several processes, such as cracking, hydrogenation, dehydrogenation, etc., in the presence of a catalyst adsorbed on a carrier.

In the art of catalytic cracking or in other catalyst processes where catalyst becomes fouled with carbonaceous material and is regenerated by oxidation, one of the major problems has been to remove the heat of combustion of the carbonaceous material without overheating the catalyst.

In the present invention I provide a novel means for dissipating a portion of the heat of combustion of the carbonaceous material during regeneration of the catalyst. For this purpose I propose to use a finely divided inorganic material which is moved through the catalyst during regeneration to carry off a portion of the heat from the catalyst. The heat can later be recovered by passing this material through a waste heat boiler, or other heat exchange apparatus, outside the regenerator and the relatively cooled finely divided inorganic material may then be returned for further heat removal from the catalyst. In carrying out the invention, the air which is used for combustion of the carbonaceous material during catalyst regeneration, or a portion of it, is employed to move the finely divided inorganic material through the catalyst.

In one form of apparatus suitable for use in practicing the process, the spent catalyst is introduced into the top of a regenerating chamber. The chamber is first charged with catalyst fines or natural clay finely divided, for instance, from 50 to 100 mesh. Air flow through the body of material is established at a rate which will not permit any of the material of that size to flow out of the bottom of the regenerator. The temperature may be raised by preheating the air supply and burning extraneous oil as in a fluid type regenerator. The spent catalyst is then introduced at the top of the regenerating chamber. It falls through the bed of finer material and is discharged at the bottom of the chamber whence it passes to an elevator or other suitable apparatus to return it to the reactor or converter in which the converting operation is being performed.

During the passage of the catalyst through the chamber the carbon is burned off and part of the liberated heat is adsorbed by the finer material. As the finer material is constantly fed into the regenerating chamber at the bottom, and as the rate of flow of air is such as to prevent it from moving downwardly, it overflows at the top of the regenerator into a surrounding chamber where it is collected, mixed with air and passed through the waste heat boiler or other heat exchanger.

In the accompanying drawing I have shown one form of apparatus suitable for use in practicing the process and forming a part of the invention. In this showing:

The figure is a vertical, sectional view illustrating, more or less diagrammatically, one means of carrying out the process.

Referring to the drawing, the reference numeral 1 designates an inner chamber which forms the regenerator proper. This chamber may be provided with a tapered bottom 2 communicating with a discharge 3. A conveyor tube 4 is connected to the bottom of the discharge. The spent catalyst is delivered to the regenerating chamber through a conveyor tube 5 having a control valve 6' therein.

The regenerating chamber is mounted in and surrounded by an outer chamber 6 forming an annular space 7 between the regenerating chamber and the surrounding chamber. The top of the regenerating chamber is open to permit the finely divided inorganic material to flow from the regenerating chamber into the space 7. The top of the chamber 6 is closed as at 8 and is provided with an outlet pipe 9 for the discharge of exhaust gases.

At the bottom of the space 7 I provide an opening communicating with a bustle pipe 10 and the lowest point in this bustle pipe is connected to a pipe 11 having a valve 12 therein. Pipe 11 in turn communicates with a pipe 13 to which air is delivered as indicated at 14. Air flowing through pipe 13 conveys the finely divided material from pipe 11 through a waste heat boiler 15 or other suitable heat exchange apparatus wherein the fines are cooled. From the waste heat boiler fines and air are conveyed through pipe 16 to a point adjacent the bottom of the regenerating chamber. A grid 17 is arranged in the chamber 1 in alignment with the end of the pipe 16 to prevent the downwardly flowing catalyst from passing into the pipe and also to disperse the air and finely divided material fed into the regenerating chamber by the pipe 16.

Surrounding the discharge 3 of the regenerator, I provide an air chamber 18 connected to a source of air under pressure by a pipe 19 and the portion of the discharge 3 within this chamber is perforated as at 20 to permit air to pass into the regenerating chamber from the air chamber 18.

When the apparatus is first put into operation, the regenerating chamber 1 is filled with the finely divided inorganic material, which may be catalyst fines or other material, such as clay, of a size of from 50 to 100 mesh. The air flow through pipe 13 and pipe 19 to the bottom of the regenerator is at a rate which will not permit any material of that size to flow downwardly in the chamber 1. At the beginning of the operation, the air is preheated to raise the material in the regenerating chamber to a temperature at which carbon deposited on catalyst fed to the regenerating chamber will be burned off.

When that condition has been established, spent catalyst is fed into the regenerating chamber through the pipe or tube 5. The catalyst falls through the bed of finer material during which time the carbon is burned off and a portion of the heat generated by the burning of the carbon is taken up by the finely divided inorganic material. As the finely divided inorganic material and air is continuously fed to the bottom of the regenerating chamber, this material overflows the top of the regenerating chamber into the chamber 7. Thence it travels by gravity to the bottom and through pipe 11 is returned to the air pipe 13. The air delivered through pipe 13 then conveys it through the waste heat boiler where the heat is extracted.

As the size of the catalyst particles becomes smaller, due to wear, the apparatus may be adjusted to maintain a balance in the system. The apparatus shown, of course, is for the purpose of illustration and other mechanism may be employed. The regenerating chamber and the surrounding chamber or vessel 6 must be of such size as to permit the smaller particles to drop out and flow downwardly between the regenerating chamber and the shell of the outer vessel.

The invention may also be applied to a fixed bed catalyst having a tubular cooling unit by circulating the powdered material through the tubes for heat removal and then through a waste heat boiler. This would overcome the objection to the use of water or salt solutions for this purpose.

The means for regenerating the catalyst herein disclosed may be employed in connection with any of the conventional conversion processes. Thus, a catalyst employed in treating a charging stock consisting of gasoline or naphtha, boiling between 250 and 500° F., may be regenerated in this manner. In such process, the catalyst may consist of pellets of a silica-alumina clay coated with alumina or aluminum. The charging stock is brought into contact with such catalyst at a temperature of about 850° F. to reform it into a material of higher octane number, lower sulphur content and higher lead susceptibility. After the use of the catalyst in such process for a period of time, the catalyst becomes fouled with deposits of carbonaceous material. The catalyst is removed from the reactor, delivered to the regenerating chamber 1 through the pipe or tube 5, regenerated and returned to the reactor through the pipe 4 and other suitable conveying mechanism, such as an elevator.

The invention may also be employed in regenerating a catalyst in pellet form consisting of porcelain coated with nickel or nickel oxide and employed in hydrogenation. In such process, the catalyst is initially arranged in a converter and a charging stock, generally consisting of unsaturated hydrocarbons, is heated to the desired temperature, mixed with hydrogen and passed through the converter. The product from the converter is condensed, taken to a receiver for the removal of unreacted hydrogen, and then fractionated. When the catalyst employed in the process becomes fouled, it is conveyed to the regenerating chamber 1 through the pipe or tube 5, and passed through the regenerating chamber. The regenerated catalyst passes through the pipe 4 to an elevator or other conveying mechanism and is returned to the converter.

I claim:

1. Apparatus of the type described comprising a regenerating chamber, conduit means for delivering a granular catalyst to the upper end of said chamber, conduit means for withdrawing the catalyst from the lower end of said chamber, a second chamber surrounding the first said chamber in open communication with the upper end of the first said chamber and so constructed and arranged as to form an annular space between the side walls of the two chambers, cooling means, a conduit leading from the lower end of the annular space to said cooling means, and means for injecting a suspension of a finely divided solid in air into a lower zone of the inner chamber said means including a conduit leading from the cooling means to the lower zone of the inner chamber.

2. Apparatus of claim 1 further characterized in that the conduit leading to the lower zone of the inner chamber extends upwardly into and coaxially with the inner chamber, the chamber being provided with a substantially horizontal grid positioned just above the upper end of said conduit, the chamber being otherwise unconstricted.

WILLIS S. GULLETTE.

REFERENCES CITED

The following references are of record in the file of this patent:

UNITED STATES PATENTS

| Number | Name | Date |
| --- | --- | --- |
| 2,031,591 | Daugherty, Jr. | Feb. 25, 1936 |
| 2,045,794 | Pier | June 30, 1936 |
| 2,376,564 | Upham et al. | May 22, 1945 |
| 2,399,050 | Martin | Apr. 23, 1946 |
| 2,455,915 | Borcherding | Dec. 14, 1948 |